March 8, 1938. C. H. COBERLY 2,110,462
CLARIFIER
Filed Feb. 13, 1937 2 Sheets-Sheet 1
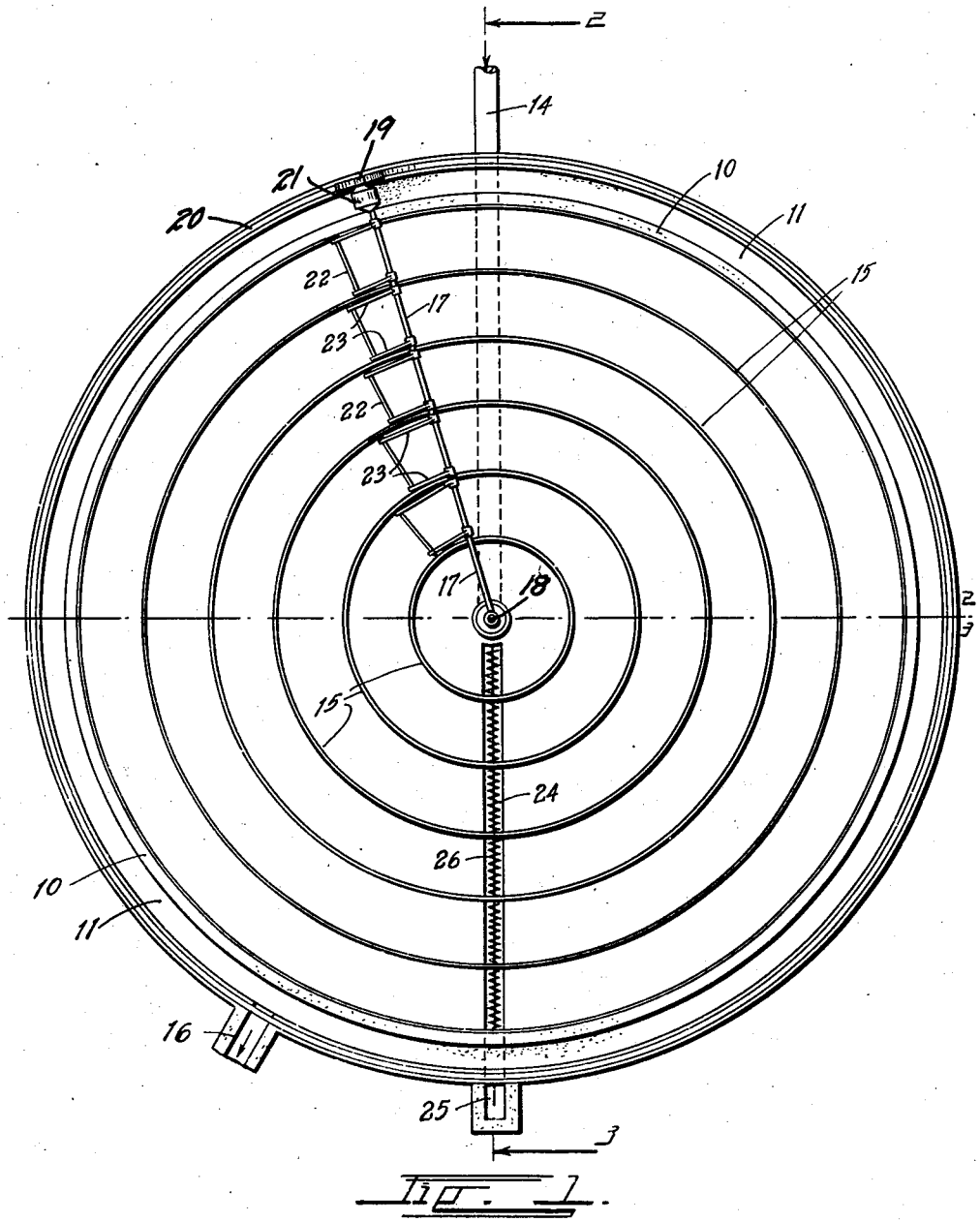
INVENTOR.
CARROL H. COBERLY
BY
ATTORNEY.

March 8, 1938. C. H. COBERLY 2,110,462
CLARIFIER
Filed Feb. 13, 1937 2 Sheets-Sheet 2
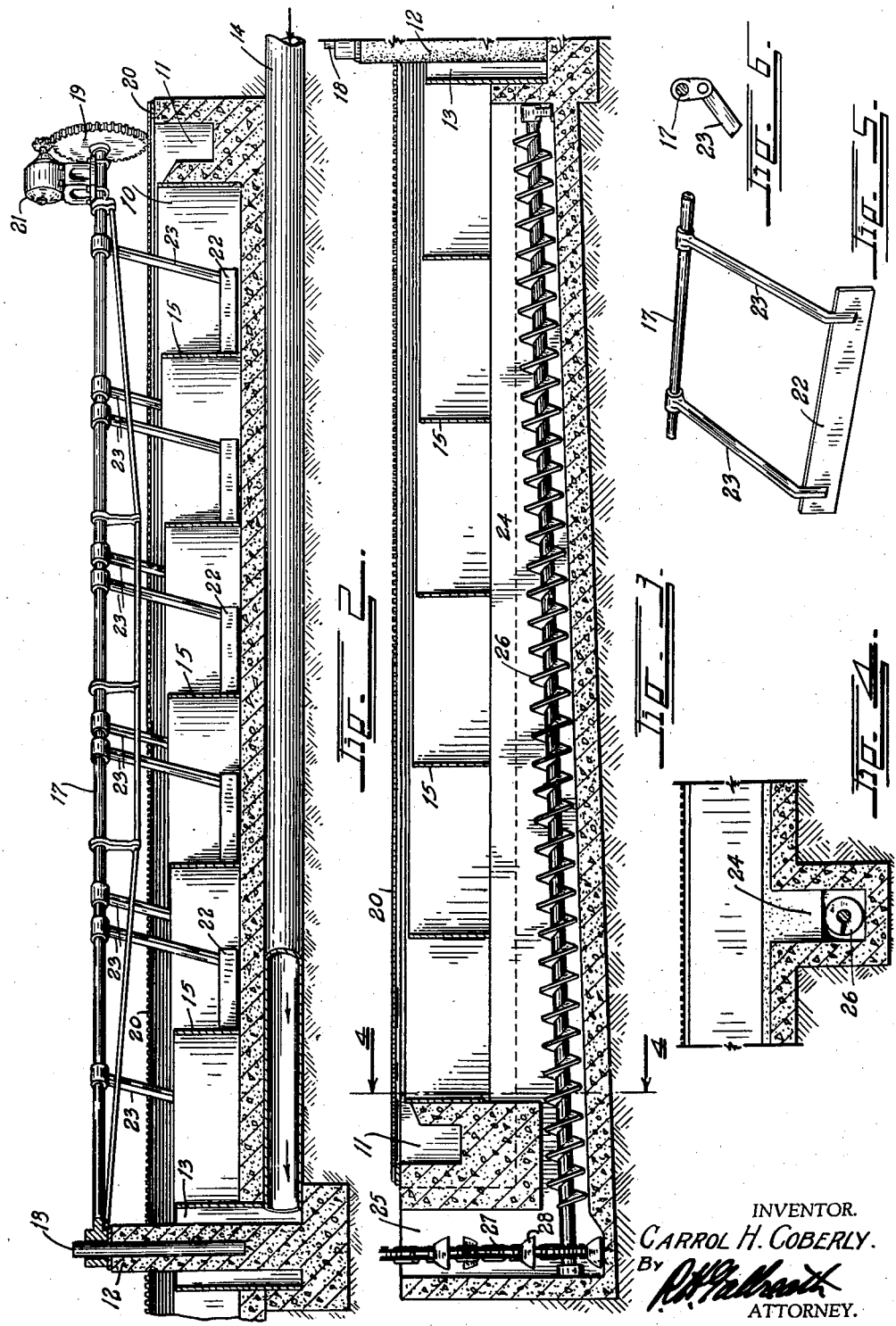
INVENTOR.
CARROL H. COBERLY.
By
ATTORNEY.

Patented Mar. 8, 1938

2,110,462

UNITED STATES PATENT OFFICE 2,110,462

CLARIFIER

Carroll H. Coberly, Denver, Colo.

Application February 13, 1937, Serial No. 125,585

11 Claims. (Cl. 210—55)

This invention relates to a clarifier for separating and removing suspended solids from solutions, and is more particularly designed for water purification, sewage disposal, metallurgical dewatering, etc. The invention is more particularly designed as an improvement over the applicant's clarifier, which is illustrated and described in copending Patent No. 2,071,320, issued Feb. 23, 1937.

The principal object of the invention is to provide a continuous clarifier of high capacity and maximum efficiency.

In the usual clarifier or settling tank, the solution is subjected to a period of low or no velocity, during which the suspended solids gravitate or settle to the bottom and the clear solution is drawn off from the top. Such a practice does not admit of efficient continuous operation and is not highly effective due to the fact that it is impossible to obtain uniform quiescence throughout the entire tank contents. The latter may be accounted for by the constant mixing of the water from top to bottom and to the formation of vortex currents of sufficient velocity to lift and hold the solids in suspension.

The vortex currents are probably due to the motion of the water at time of admission and to variations in temperature between the top and bottom of the tank, surface winds, etc., all of which interfere with effective settling.

In this invention a clarifier is provided which will not be dependent on quiescent settling action, nor upon reduced velocities for deposition of its solids; and which will effectively clarify a continuously flowing stream of solution.

Another object of the invention is to provide means for the continuous removal of the settled solids without disturbing the settling action of the solution.

Other objects and advantages reside in the detail construction of the invention, which is designed for simplicity, economy, and efficiency. These will become more apparent from the following description.

In the following detailed description of the invention reference is had to the accompanying drawings which form a part hereof. Like numerals refer to like parts in all views of the drawing and throughout the description.

In the drawings:—

Fig. 1 is a plan view of a clarifier in which the invention is embodied.

Figs. 2 and 3 together form a complete cross section on an enlarged scale through the clarifier on the line 2—3, Fig. 1.

Fig. 4 is a cross section through the sediment discharge, taken on the line 4—4, Fig. 3.

Fig. 5 is a detail view of one of the sediment scrapers as used in the invention.

Fig. 6 is a detail view of an alternate form of scraper connection.

The invention comprises a circular basin 10 provided with a peripheral overflow channel 11. At the center of the basin 10 is a pedestal 12, about which an influent stand pipe 13 is formed. The solution to be clarified is fed to the stand pipe 13 through an influent conduit 14 below the floor of the basin 10. A series of concentric baffle plates 15 surround the pedestal 12 at spaced-apart intervals. These plates may be suspended from above or, as illustrated, supported on the floor of the basin 10.

It is desired to call attention to the fact that the baffle plates 15 successively increase in heighth as the periphery is approached so as to successively decrease the depth of solution flowing over each successive plate. The successive decrease in depth is preferably directly proportional to the successively increasing circumferences of the plates, so as to maintain the total fluid cross section over each plate substantially equal in area to the total fluid cross sectional area over each of the other plates. The purpose of this is to maintain a uniform velocity of flow over all plates from the center to the peripheral discharge.

Naturally the solids settle from this flow on an angle which is the resultant between their specific gravity and the velocity. Thus, the heavier solids settle on a very abrupt angle. The baffle plate 15 nearest the center will of course be further from the surface than the other baffle plates, and will intercept only the heaviest, abrupt angle precipitates. Each of the following baffles will then intercept and collect the settling solids in successive degrees of lightness. The very light material will travel on a very gradual incline so that adjacent the periphery they will be but slightly below the surface. These will be caught by the last baffle which is spaced but slightly below the surface of the fluid. Therefore the only solids which could escape into the channel 11 are surface floating solids.

The solution flows continuously from the stand pipe 13 to the receiving channel 11 and from thence discharges through one or more effluent outlets 16 placed at any desired points. The settled material constantly falls to the bottom of the concentric channels between each pair of the concentric baffle plates 15 from whence, if a continuous machine is not desired, it can be collected at suitable intervals.

For continuous operation, however, a truss rod 17 is extended from a pivot shaft 18 at the pedestal 12 to any suitable carriage at the outer periphery of the channel 11. As illustrated, the truss rod 17 is carried in a drive gear 19 which travels on a circular rack 20 on the outer wall of the channel 11. The drive gear can be driven from any suitable motor 21 as is usual in the art. A series of scraper arms 23 are hingedly mounted on the shaft 17. These arms connect at their lower extremities with scraper blades 22 which rest of their own weight on the bottom of the basin 10. The motor 21 rotates the drive gear 19 very slowly so that the arm 17 will make approximately one revolution per hour about the basin. This speed of course, can be varied to suit the quantity of solids being separated from the particular solution being treated.

The invention is not necessarily limited to a single truss rod 17 since the device could use two or more sets of scraper blades to give a more rapid removal of the solids without increasing the rate of movement of the scrapers, thereby avoiding turbulence without decreasing capacity.

The scrapers 22 drag the settled material to a radially extending sediment ditch 24 extending outwardly from the pedestal 12 to a point beyond the outer wall of the channel 11 where it terminates in a collecting well 25. The sediment is moved along the ditch to the well 25 by means of a suitable scroll conveyer 26 which may be driven in any desired manner, such as by means of a chain 27. The chain 27 could, if desired, be provided with buckets 28 which would act to elevate the collected solids from the well to any desired point. By this arrangement, the solids are continuously removed from the basin 10 so that the solution may flow continuously and indefinitely through the basin.

It is preferred to have the upper extremity of the influent pipe 13 terminate below the solution level and below the top of the first or innermost baffle plate to avoid turbulence in the first settling chamber.

It is desired to call particular attention to the fact that all solution flow in the clarifier is confined to that portion of the fluid above the top edges of the baffles and that the velocity of this flow is absolutely uniform throughout the entire surface area. There are no lines of rapid flow or areas of little or no flow to create whirls and eddy currents. The depth over the baffles decreases inversely as the area increases so that a quiet uniform flow is maintained over the entire surface.

Between the baffles the solution is absolutely quiescent so that the settling rates are undisturbed and the accumulated settled sludge is not again agitated or returned to the solution.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:—

1. A clarifier for solutions comprising: a basin; an influent inlet in said basin; a horizontal overflow lip around said basin determining the fluid level therein; a series of baffle plates positioned between said inlet and said overflow lip, each of said plates surrounding said inlet and being spaced from the adjacent plates; the upper edge of each of said plates lying in a horizontal plane below the solution level; the plane of the upper edge of the outermost plate having a higher elevation than the plane of the upper edge of the innermost plate.

2. A clarifier for solutions comprising: a basin; an influent inlet in said basin; a horizontal overflow lip around said basin determining the fluid level therein; a series of baffle plates positioned between said inlet and said overflow lip, each of said plates surrounding said inlet and being spaced from the adjacent plates; the upper edge of each of said plates lying in a horizontal plane below the solution level; the plane of the upper edge of the outermost plate having a higher elevation than the plane of the upper edge of the innermost plating; and the planes of the upper edges of the intermediate plates successively increasing in elevation as the outermost plate is approached, to maintain a substantially uniform surface flow velocity from said inlet to said overflow lip.

3. A clarifier for solutions comprising: a circular basin; a series of parallel concentric circular baffle members positioned in said basin; an overflow channel surrounding said basin, said baffles successively approaching the solution line toward said overflow channel so that the depth of solution over each baffle will successively decrease as said channel is approached; an annular settling chamber between each pair of baffles; and means for removing sediment from each of said chambers.

4. A clarifier comprising: a substantially circular basin; means for admitting influent at the middle of said basin; an overflow at the periphery of said basin; and a series of parallel submerged baffle members in the path of flow from said middle to said periphery, the upper edge of each being higher than the upper edge of the next innermost baffle member so as to successively decrease the depth of solution thereover as the overflow is approached and maintained a substantially uniform surface velocity.

5. A clarifier comprising: a substantially circular basin; means for admitting influent at the middle of said basin; means for discharging effluent at the periphery of said basin; a series of concentric, spaced-apart baffle members below the fluid level in said basin and in the path of flow from said middle to said periphery, said baffle members increasing in elevation toward said periphery so as to successively decrease the depth of solution thereover; and a scraper member traveling in an annular path between each pair of baffle members for collecting the sediment from between said baffle members.

6. A clarifier comprising: a substantially circular basin; an influent inlet at the middle of said basin; means for discharging effluent about the periphery of said basin; a series of annular concentric, submerged baffle members in the path of flow from said influent inlet to said overflow, said baffle members successively increasing in heighth as the overflow is approached so as to successively decrease the depth of solution as the circumference increases so as to maintain a substantially uniform surface flow velocity; a supporting member extending radially from a pivotal connection at the middle of said basin over the latter; and a series of scraper members suspended from said supporting member and depending between the adjacent baffle members to collect the sediment settling between the latter.

7. A clarifier for solutions comprising: a circular basin; a sediment chamber in the bottom of said basin; an influent inlet at the middle of said basin; a series of spaced-apart concentric baffle plates surrounding said intake; an overflow channel surrounding said basin; a pivot member at the middle of said basin; an arm extending from said pivot member to the periphery of said basin; a carriage supporting said arm at said periphery; a scraper member depending from said arm between each pair of said baffle plates; and means for rotating said arm about said pivot member to cause said scraper members to convey sediment to said sediment chamber.

8. A clarifier for solutions comprising: a circular basin; an influent inlet at the middle of said basin; a series of spaced-apart concentric baffle plates surrounding said intake; an overflow channel surrounding said basin; a pivot member at the middle of said basin; an arm extending from said pivot member to the periphery of said basin; a carriage supporting said arm at said periphery; a scraper member depending from said arm between each pair of said baffle plates; means for rotating said arm about said pivot member; a channel in the bottom of said basin into which material is swept by said scrapers; and means for removing collected sediment from said channel.

9. A clarifier for solutions comprising: a circular basin; an influent inlet at the middle of said basin; a series of spaced-apart concentric baffle plates surrounding said intake; an overflow channel surrounding said basin a pivot member at the middle of said basin; an arm extending from said pivot member to the periphery of said basin; a carriage supporting said arm at said periphery; a scraper member depending from said arm between each pair of said baffle plates; means for rotating said arm at said periphery; a scraper member depending from said arm between each pair of said baffle plates; means for rotating said arm about said pivot member; a channel in the bottom of said basin into which material is swept by said scrapers; and a conveyor in said channel for removing sediment therefrom.

10. A clarifier for solutions comprising: a circular basin; an influent inlet at the middle of said basin; a series of spaced-apart concentric baffle plates surrounding said intake; and overflow channel surrounding said basin; a pivot member at the middle of said basin; an arm extending from said pivot member to the periphery of said basin; a carriage supporting said arm at said periphery; a scraper member depending from said arm between each pair of said baffle plates; means for rotating said arm about said pivot member; a channel in the bottom of said basin into which material is swept by said scrapers; means for removing collected sediment from said channel; and a collecting well beyond the periphery of said basin for receiving said sediment.

11. A clarifier for solutions comprising: a circular basin; an influent inlet at the middle of said basin; a series of spaced-apart concentric baffle plates surrounding said intake; an overflow channel surrounding said basin; a pivot member at the middle of said basin; an arm extending from said pivot member to the periphery of said basin; a carriage supporting said arm at said periphery; a scraper member depending from said arm between each pair of said baffle plates; means for rotating said arm about said pivot member; a channel in the bottom of said basin into which material is swept by said scrapers; means for removing collected sediment from said channel; a receiving well beyond the periphery of said basin for receiving said sediment; and means for lifting material from said receiving well.

CARROLL H. COBERLY.